(12) United States Patent
Leany et al.

(10) Patent No.: US 6,879,070 B2
(45) Date of Patent: Apr. 12, 2005

(54) METHODS AND SYSTEMS FOR ELECTRIC MOTOR VOLTAGE CHANGE

(75) Inventors: Thaylen K. Leany, Ft. Wayne, IN (US); Lynn Edwin Fisher, Ft. Wayne, IN (US); Narayan Mangesh, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/062,103

(22) Filed: Jan. 31, 2002

(65) Prior Publication Data

US 2003/0141771 A1 Jul. 31, 2003

(51) Int. Cl.$^7$ .............................................. H02K 11/00
(52) U.S. Cl. ........................................ 310/71; 439/709
(58) Field of Search ................................ 439/709, 217, 439/222, 224, 491; 310/71

(56) References Cited

U.S. PATENT DOCUMENTS 5,017,818 A * 5/1991 Dohogne ..................... 310/71

* cited by examiner

Primary Examiner—Thanh Lam
(74) Attorney, Agent, or Firm—Armstrong Teasdale LLP

(57) ABSTRACT

A terminal board assembly for a multi-voltage device. The terminal board assembly includes a terminal board including a terminal block. The terminal board is configured for attachment to the multi-voltage device. The terminal block is configured to electrically couple with an electrical power source and the multi-voltage device. The assembly also includes a plug that is configured for insertion within the terminal block. The terminal block is configured to receive the plug in at least one of a first inserted position and a second inserted position. The orientation of the plug relative to the terminal block is the same in the first inserted position as in the second inserted position. The terminal block is configured to transfer a first voltage to the multi-voltage device when the plug is attached to the terminal block in the first inserted position. The terminal block is configured to transfer a second voltage to the multi-voltage device when the plug is attached to the terminal block in the second inserted position.

27 Claims, 8 Drawing Sheets

METHODS AND SYSTEMS FOR ELECTRIC MOTOR VOLTAGE CHANGE

BACKGROUND OF THE INVENTION

This invention relates generally to electric motors and more specifically to three-phase electric motor voltage connections.

At least some known electric motors are constructed to operate at different voltages using power supply voltages available in conventional power distribution systems. Typically, three-phase motors operate at either 230 volts or 460 volts depending on the particular application and the available voltage. Three-phase electric motors include a winding for each phase, and each phase winding includes two groups of coils. The leads of each coil group are coupled to a junction box for connection to a power source. The leads may be connected in several different configurations to electrically configure the motor for operation at a predetermined voltage. For example, when the coils of each of the phase windings are connected in series, the motor may operate at twice the voltage that is possible when the coils of each phase winding are connected in parallel. Known voltage change devices for three phase electric motors are costly and difficult to assemble. In addition, known voltage change devices may be difficult to use, and may have reliability problems in the field.

BRIEF DESCRIPTION OF THE INVENTION

In one aspect, a terminal board assembly is provided for a multi-voltage device. The terminal board assembly includes a terminal board that including a terminal block. The terminal board is configured for attachment to the multi-voltage device. The terminal block is configured to electrically couple with an electrical power source and the multi-voltage device. The assembly also includes a plug configured for insertion within the terminal block. The terminal block is configured to receive the plug in at least one of a first inserted position and a second inserted position. The orientation of the plug relative to the terminal block is the same in the first inserted position as in the second inserted position. The terminal block is configured to transfer a first voltage to the multi-voltage device when the plug is attached to the terminal block in the first inserted position. The terminal block is configured to transfer a second voltage to the multi-voltage device when the plug is attached to the terminal block in the second inserted position.

In another aspect, an electric motor assembly is provided. The assembly includes a three-phase electric motor including a housing, and a stator mounted in the housing and including a bore therethrough. The stator includes a plurality of windings, wherein each winding represents a respective phase of the three-phase electric motor. A rotor core is rotatably mounted in the housing and extends through the stator bore. The assembly also includes a terminal board assembly including a terminal board having a terminal block. The terminal block is electrically coupled with the windings and is configured to electrically couple with an electrical power source. The terminal board assembly also includes a plug configured for insertion within the terminal block. The terminal block is configured to receive the plug in at least one of a first inserted position and a second inserted position. The orientation of the plug relative to the terminal block is the same in the first inserted position as in the second inserted position. The terminal block is configured to transfer a first voltage to the windings when the plug is attached to the terminal block in the first inserted position. The terminal block is configured to transfer a second voltage to the windings when the plug is attached to the terminal block in the second inserted position. The second voltage is higher than the first voltage. A mounting structure is coupled to the terminal board and the motor such that the terminal board is fixedly attached to the motor.

In yet another aspect, a method is provided for changing the operating voltage of a multi-voltage device including a terminal board. The terminal board includes a terminal block coupled with the terminal board, and a plug that is inserted within and received by the terminal block. The terminal block is configured to receive the plug in at least one of a first inserted position and a second inserted position. The terminal block includes a central axis extending along the length thereof. The method includes removing the plug from the first inserted position, moving the plug linearly along the central axis of the terminal block, and inserting the plug within the terminal block such that the plug is attached to the terminal block in the second inserted position.

In a further aspect a terminal board assembly for a multi-voltage device is provided. The assembly includes a terminal board having a terminal block. The terminal board is configured for attachment to the multi-voltage device. The terminal block is and integral part of the terminal board and is configured to electrically couple with an electrical power source and the multi-voltage device. A plug is configured for insertion within the terminal block. The terminal block is configured to receive the plug in at least one of a first inserted position and a second inserted position. The terminal block is configured to transfer a first voltage to the multi-voltage device when the plug is attached to the terminal block in the first inserted position. The terminal block is configured to transfer a second voltage to the multi-voltage device when the plug is attached to the terminal block in the second inserted position.

DETAILED DESCRIPTION OF THE INVENTION

Figure 1:
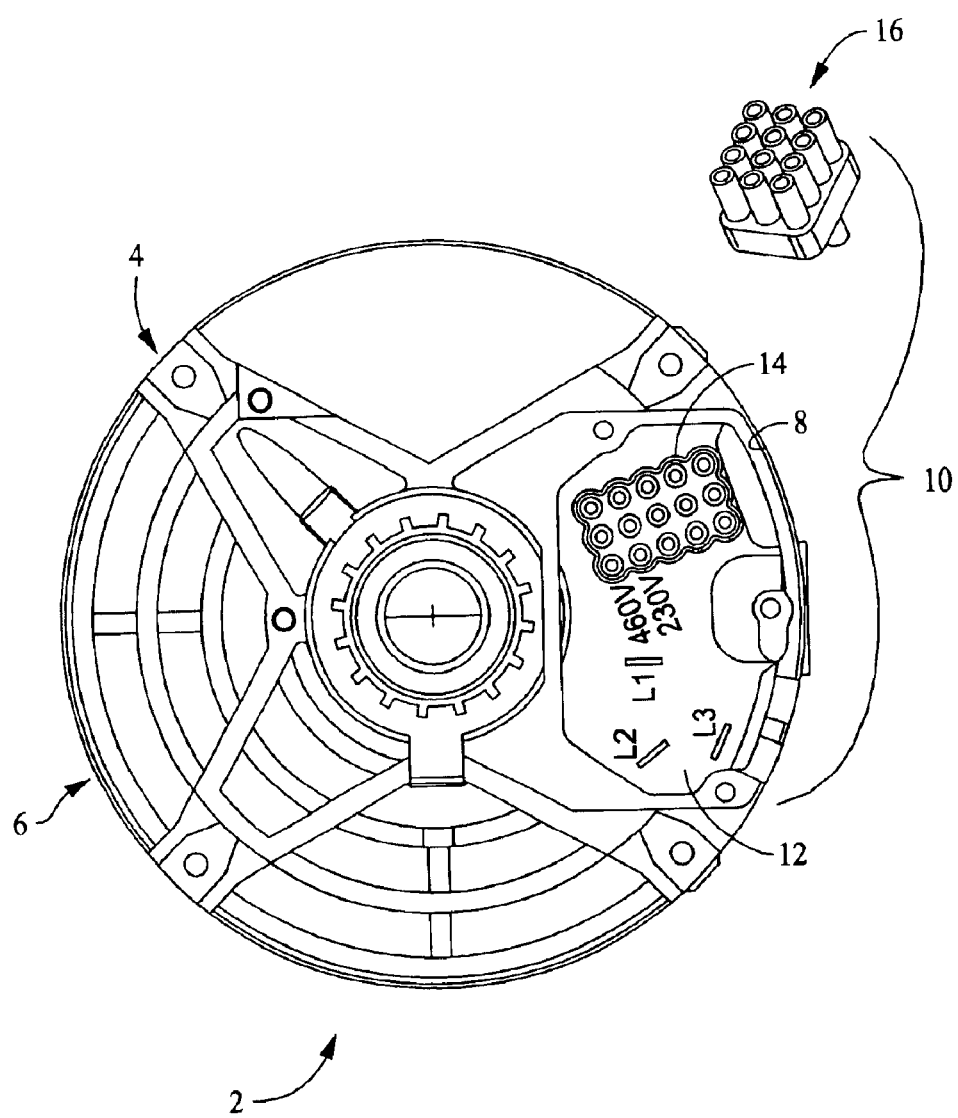
FIG. 1 is a top view of an exemplary embodiment of an electric motor assembly of the present invention.

FIG. 1 is a top view of one embodiment of an electric motor assembly 2 including an electric motor 4. Motor 4 may be any motor used in light commercial air-conditioning systems and other commercial and light industrial applications where three-phase electrical power is available. For example, in one embodiment, motor 4 is a NEMA 56 frame motor. In an alternative embodiment, motor 4 is a NEMA 140 frame motor. Motor 4 includes a housing 6 having an interior surface 8. Motor assembly 2 includes a terminal board assembly 10 that includes a terminal board 12, a terminal block 14, and a plug 16. Terminal board 12 is fixedly attached to interior surface 8 of motor housing 6. Terminal block 14 is an integral part of terminal board 12 and is configured to electrically connect to an electrical power source (not shown) and the motor. In an alternative embodiment, terminal block 14 is not an integral part of terminal board 12, but is rather coupled to terminal board 12 such that terminal block 14 is fixedly attached to terminal board 12. Plug 16 is configured to be at least partially inserted within, and received by, terminal block 14. Terminal block 14 is further configured to transfer a first voltage and a second voltage to motor 4. Although terminal board assembly 10 is herein illustrated and described in conjunction with motor 4, it will be understood that terminal board assembly may transfer a first and a second voltage to any multi-voltage device, and is not limited to electric motors.

Figure 2:
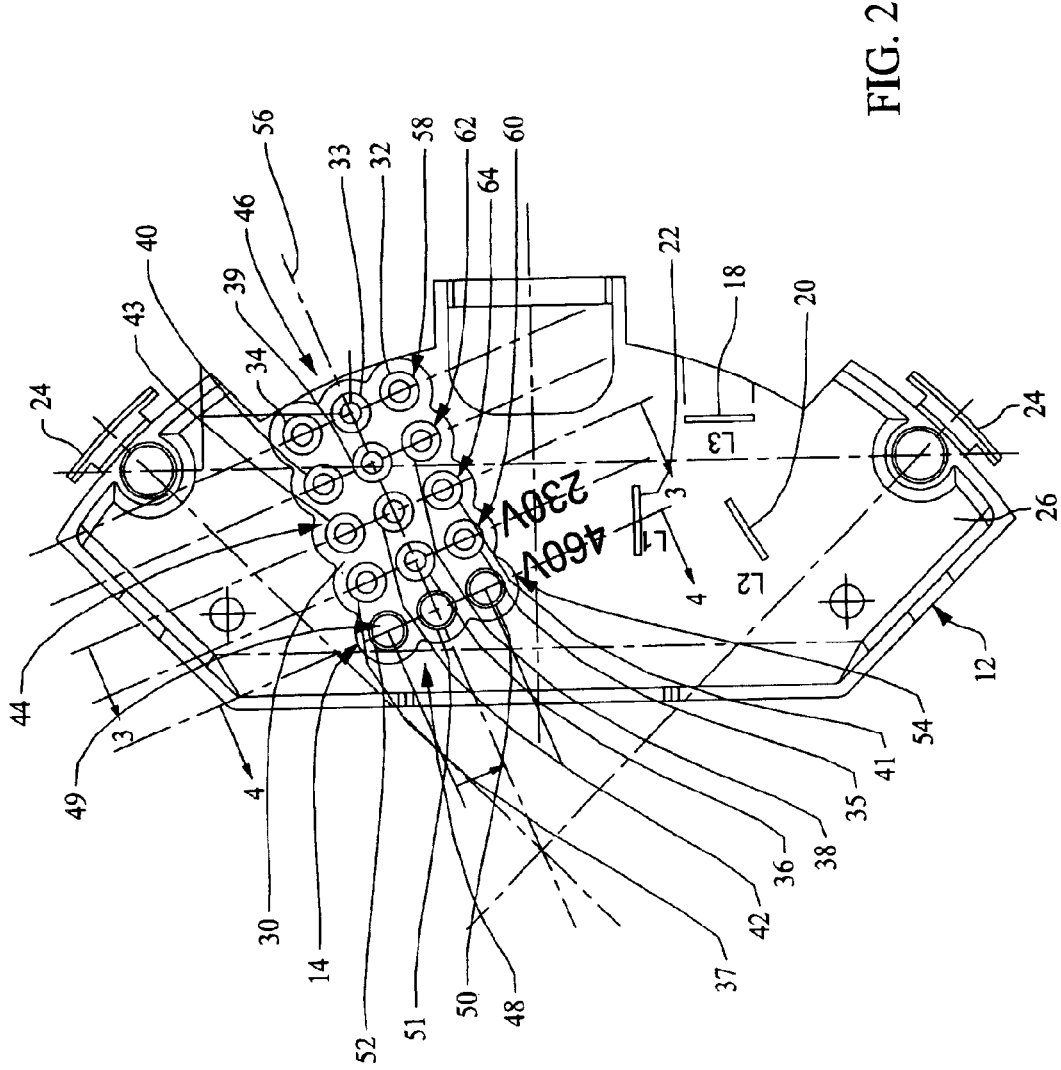
FIG. 2 is a top view of one embodiment of a terminal board of the present invention.

FIG. 2 is a top view of terminal board 12. In one embodiment, terminal board 12 is molded from plastic. However, it will be understood that terminal board 12 may be formed from any suitable material and any suitable manufacturing process, such that terminal board 12 facilitates transferring voltage from an electrical power source (not shown) to motor 4 (shown in FIG. 1) without interfering with the operation of motor 4. Motor 4 includes a plurality of windings (not shown), wherein each winding represents a respective phase. Terminal board 12 includes terminal block 14, a plurality of slots 18, 20, and 22, a plurality of mounting supports 24, and an upper face 26. In one embodiment, terminal board 12 includes three slots 18, 20, and 22. In one embodiment, terminal board 12 includes two mounting supports 24. Slots 18, 20, and 22 extend completely through terminal board 12 and a power supply terminal (not shown) is mounted within each slot 18, 20, and 22. The power supply terminals are electrically connected to an electrical power source. Mounting supports 24 are configured to mate with a portion motor housing 6 in an interference fit. In one embodiment, each mounting support 24 is received by a respective slot (not shown) in interior surface 8 (shown in FIG. 1) of motor housing 6 (shown in FIG. 1) and engaged with the slots in an interference fit, such that terminal board 12 is fixedly coupled to motor housing 6. In alternative embodiments, it will be understood that terminal board 12 may include any suitable mounting structure and may be mounted to motor 4 in any suitable fashion that fixedly couples board 12 to motor housing 6.

Terminal block 14 includes an upper surface 30 and a plurality of sockets arranged in a '3×4' matrix 44. In one embodiment, terminal block 14 includes twelve sockets 32, 33, 34, 35, 36, 37, 38, 39, 40, 41, 42, and 43. Matrix 44, known as a socket matrix 44, includes a first end 46 and a second end 48. Socket matrix 44 is electrically connected to the power supply terminals and the phase windings, and is configured to transfer electrical power to the phase windings. Terminal block 14 also includes a plurality of openings arranged in a row 49. In one embodiment, terminal block 14 includes three openings 50, 51, and 52. Row 49 of openings 50, 51, and 52 are positioned adjacent socket matrix second end 48 such that sockets 32, 33, 34, 35, 36, 37, 38, 39, 40, 41, 42, and 43, and openings 50, 51, and 52 form a '3×5' matrix 54. A central axis 56 extends along a length of terminal block 14 from first end 46 to row 49 of openings 50, 51, and 52.

Socket matrix 44 includes a first row 58, a second row 60, a third row 62, and a fourth row 64. First row 58 is adjacent first end 46 of socket matrix 44, and second row 60 is adjacent second end 48 of socket matrix 44. Third and fourth rows 62 and 64, respectively, are positioned between first row 58 and second row 60. First row 58 includes sockets 32, 33, and 34, second row 60 includes sockets 35, 36, and 37, third row 62 includes socket 38, 39, and 40, and fourth row 64 includes sockets 41, 42, and 43.

Figure 3:
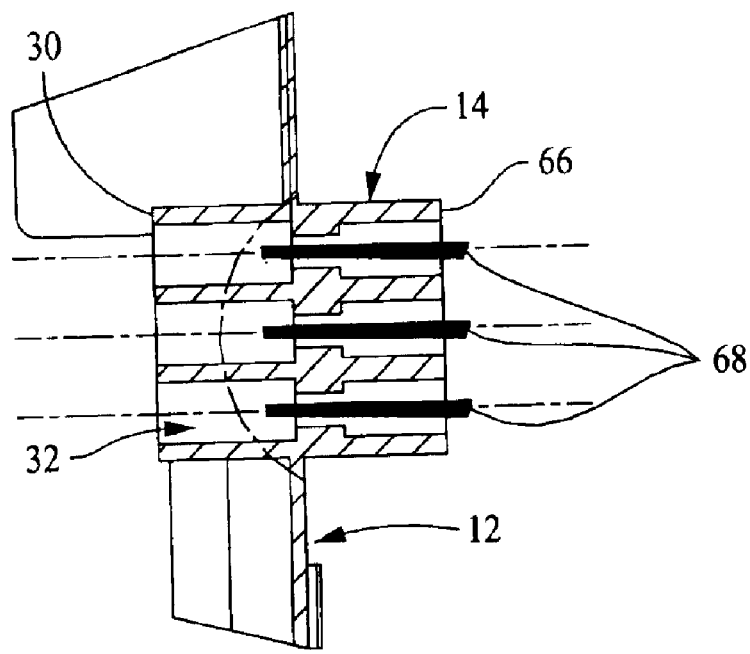
FIG. 3 is a partial cross-section taken along line 3—3 of FIG. 2 illustrating one embodiment of a terminal block of the present invention.

FIG. 3 is a partial cross-section of terminal board 12 taken along line 3—3 of FIG. 2. Sockets 32, 33, 34, 35, 36, 37, 38, 39, 40, 41, 42, and 43 extend from upper surface 30 of terminal block 14 completely through terminal block 14 and a lower surface 66 of terminal block 14. Each socket 32, 33, 34, 35, 36, 37, 38, 39, 40, 41, 42, and 43 includes a socket contact 68 and a pin receptacle (not shown). In one embodiment, terminal block 14 is connected to a motor overload protector (not shown).

Figure 4:
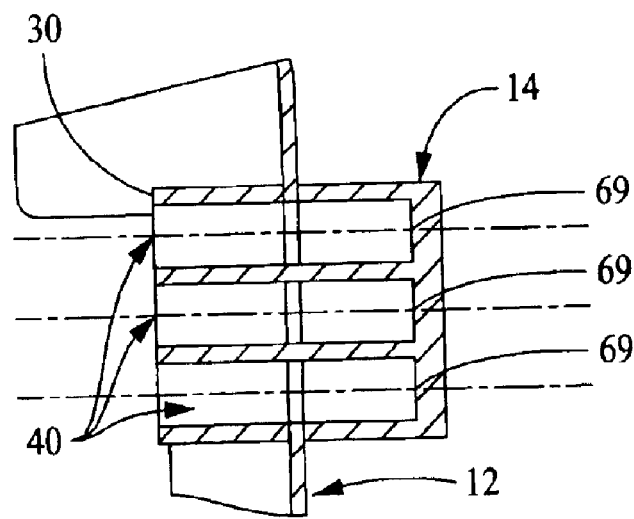
FIG. 4 is a partial cross-section taken along line 4—4 of FIG. 2 illustrating one embodiment of a terminal block of the present invention.

FIG. 4 is a partial cross-section of terminal block 14 taken along line 4—4 of FIG. 2. FIG. 4 illustrates openings 50, 51, and 52 extending from upper surface 30 of terminal block 14 to a respective bottom 69 of openings 50, 51, and 52. Openings 50, 51, and 52 do not include socket contacts 68 (shown in FIG. 3).

Figure 5:
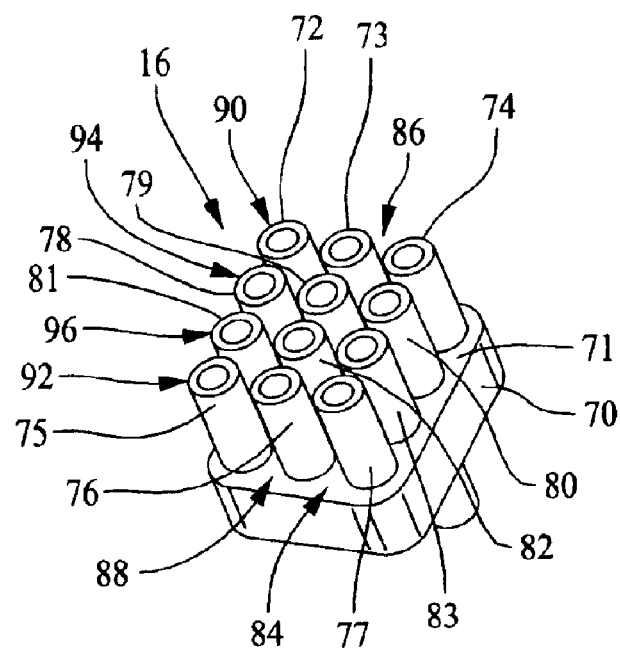
FIG. 5 is a perspective of one embodiment of a plug of the present invention.

FIG. 5 is a perspective view of plug 16. Plug 16 includes a housing 70 having a first face 71, and a plurality of tubular extensions. In one embodiment, plug 16 includes twelve tubular extensions 72, 73, 74, 75, 76, 77, 78, 79, 80, 81, 82, and 83. Extensions 72, 73, 74, 75, 76, 77, 78, 79, 80, 81, 82, and 83 extend outwardly from first face 71 and are arranged in a '3×4' matrix 84, hereinafter referred to as tubular extension matrix 84. Tubular extension matrix 84 includes a first end 86 and a second end 88. Each of tubular extensions 72, 73, 74, 75, 76, 77, 78, 79, 80, 81, 82, and 83 is sized and shaped to mate with corresponding sockets 32, 33, 34, 35, 36, 37, 38, 39, 40, 41, 42, and 43 (shown in FIG. 2) and corresponding openings 50, 51, and 52 (shown in FIG. 2). Each socket 32, 33, 34, 35, 36, 37, 38, 39, 40, 41, 42, and 43, and each opening 50, 51, and 52 is sized and shaped to receive each respective extension 72, 73, 74, 75, 76, 77, 78, 79, 80, 81, 82, and 83. In addition, socket matrix 44 (shown in FIG. 2), sockets 32, 33, 34, 35, 36, 37, 38, 39, 40, 41, 42, and 43, tubular extension matrix 84, and extensions 72, 73, 74, 75, 76, 77, 78, 79, 80, 81, 82, and 83 are appropriately sized such that all extensions 72, 73, 74, 75, 76, 77, 78, 79, 80, 81, 82, and 83 of plug 16 may be simultaneously inserted within, and received by, respective sockets 32, 33, 34, 35, 36, 37, 38, 39, 40, 41, 42, and 43, or a combination of sockets 32, 33, 34, 35, 36, 37, 38, 39, 40, 41, 42, and 43, and openings 50, 51, and 52.

Tubular extension matrix 84 includes a first row 90, a second row 92, a third row 94, and a fourth row 96. First row 90 is adjacent first end 86 of tubular extension matrix 84, and second row 92 is adjacent second end 88 of tubular extension matrix 84. Third and fourth rows 94 and 96, respectively, are positioned between first row 90 and second row 92. First row 90 includes extensions 72, 73, and 74, second row 92 includes extensions 75, 76, and 77, third row 94 includes extensions 78, 79, and 80, and fourth row 96 includes sockets 81, 82, and 83.

Figure 6:
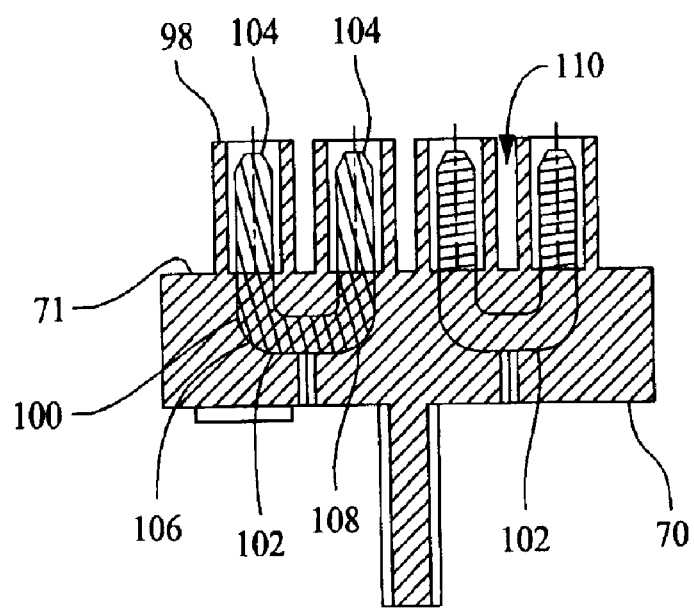
FIG. 6 is a cross-section of one embodiment of a plug of the present invention.

FIG. 6 is a cross-section of plug 16. Tubular extensions 72, 73, 74, 75, 76, 77, 78, 79, 80, 81, 82, and 83 each include an outward end 98. Plug 16 includes a plurality of unshaped jumper wires 100. In one embodiment, plug 16 includes six jumper wires 100. Jumper wires 100 each include a bottom 102 and two legs 104. Bottom 102 includes a first end 106 and a second end 108. Legs 104 extend outwardly from opposing ends 106, and 108 of bottom 102 such that jumper wires 100 each have an open end 110 and a closed end 112. Jumper wires 100 are therefore a continuous unshaped electrical contact. Jumper wire legs 104 extend from bottom 102 through plug housing 70 and within respective tubular extensions 72, 73, 74, 75, 76, 77, 78, 79, 80, 81, 82, and 83 toward tubular extension outer ends 98. Jumper wires 100, tubular extensions 72, 73, 74, 75, 76, 77, 78, 79, 80, 81, 82, and 83, sockets 32, 33, 34, 35, 36, 37, 38, 39, 40, 41, 42, and 43 (shown in FIG. 2), and socket contacts 68 (shown in FIG. 3) are configured such that when tubular extensions 72, 73, 74, 75, 76, 77, 78, 79, 80, 81, 82, and 83 are received by sockets 32, 33, 34, 35, 36, 37, 38, 39, 40, 41, 42, and 43, respective socket contacts 68 electrically connect with respective jumper wire legs 104. Furthermore, when a single jumper wire 100 is electrically connected with two adjacent socket contacts 68 via two jumper wire legs 104, a single jumper wire 100 electrically connects, or shorts, adjacent socket contacts 68.

Figure 7:
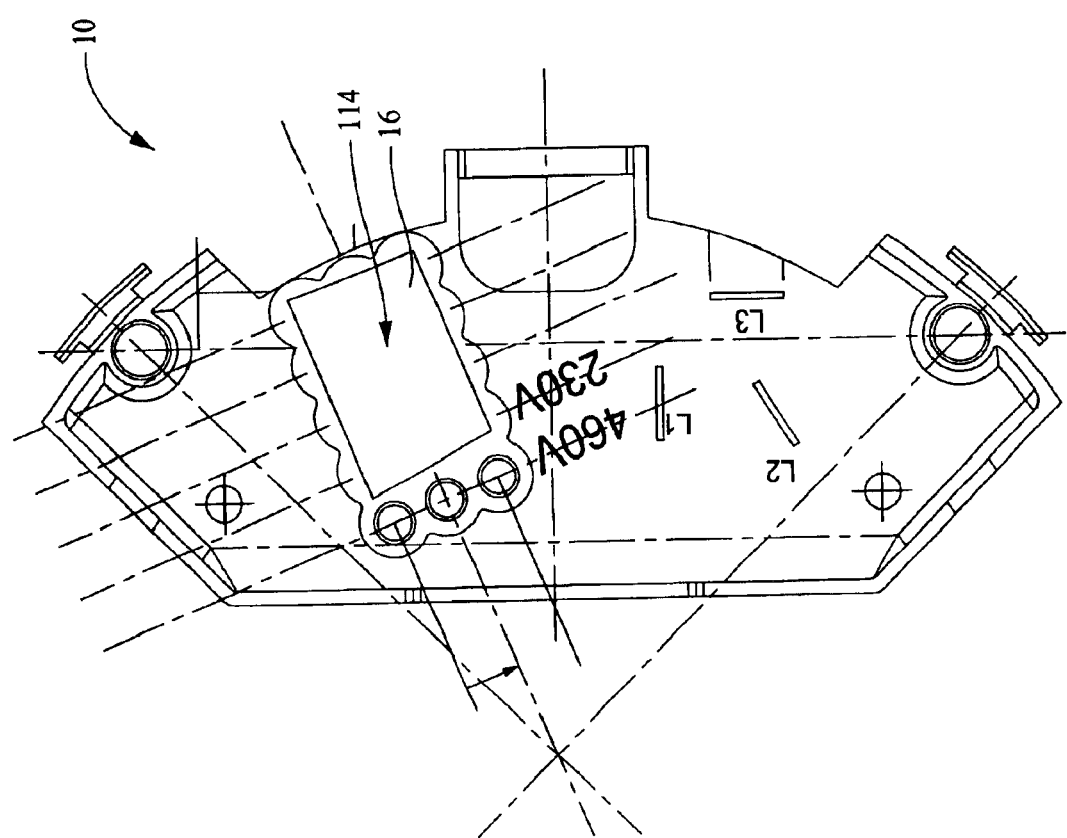
FIG. 7 is a top view of one embodiment of a terminal board assembly of the present invention.

FIG. 7 is a top view of terminal board assembly 10. When a low voltage operation of motor 4 (shown in FIG. 1) is desired, plug 16 is attached to terminal block 14 in a first inserted position 114. When plug 16 is attached to terminal block 14 in first inserted position 114, first row 90 of tubular extension matrix 84 is received by, first row 58 of socket matrix 44 such that extension 72 received by socket 32, extension 73 is received by socket 33, and extension 74 is received by socket 34. Furthermore, second row 92 of tubular extension matrix 84 is received by second row 60 of socket matrix 44 such that extension 75 is received by socket 35, extension 76 is received by socket 36, and extension 77 is received by socket 37. In addition, third row 94 of tubular extension matrix 84 is received by third row 62 of socket matrix 44 such that extension 78 is received by socket 38, extension 79 is received by socket 39, and extension 80 is received by socket 40. Additionally, fourth row 96 of tubular extension matrix 84 is received by fourth row 64 such that extension 81 is received by socket 41, extension 82 is received by socket 42, and extension 83 is received by socket 43.

When plug 16 is attached in first inserted position 114, a portion of socket contacts 68 (shown in FIG. 3) are electrically connected to the phase windings (not shown) of motor 4 (shown in FIG. 1) and/or the overload protector (not shown), and a portion of socket contacts 68 (shown in FIG. 3) are electrically connected to the power supply terminals (not shown). When plug 16 is attached in first inserted position 114, the electrical connections between socket contacts 68 and the phase windings and the power supply terminals are arranged, and jumper wires 100 short together adjacent socket contacts 68, in such a configuration that the phase windings of motor 4 are electrically connected in parallel. Accordingly, when plug 16 is attached in first inserted position 114, and when the power supply terminals are electrically connected to a low voltage power source, terminal block 14 transfers low voltage to the motor phase windings such that motor 4 operates using the low voltage. In one embodiment, motor 4 operates at 230 Volts when plug 16 is attached in first inserted position 114. Alternatively, motor 4 may operate at any other suitable voltage level when plug 16 is attached in first inserted position 94.

Figure 8:
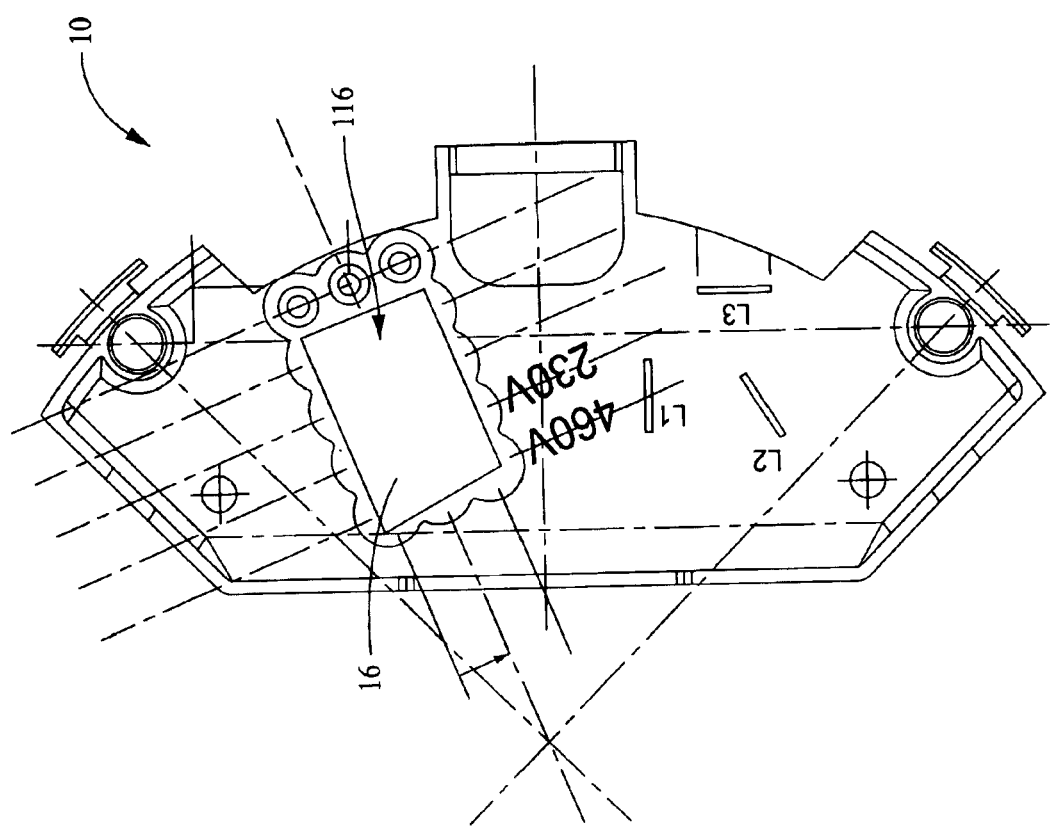
FIG. 8 is a top view of one embodiment of a terminal board assembly of the present invention.

FIG. 8 is a top view of terminal board assembly 10. When a high voltage operation of motor 4 (shown in FIG. 1) is desired, plug 16 is inserted within terminal block 14 in a second inserted position 116. When plug 16 is attached in second inserted position 116, first row 90 of tubular extension matrix 84 is received by third row 62 of socket matrix 44 such that extension 72 is received by socket 38, extension 73 is received by socket 39, and extension 74 is received by socket 40. Furthermore, second row 92 of tubular extension matrix 84 is received by the row of openings 49 such that extension 75 is received by opening 50, extension 76 is received by opening 51, and extension 77 is received by opening 52. In addition, third row 94 of tubular extension matrix 84 is received by fourth row 64 of socket matrix 44 such that extension 78 is received by socket 41, extension 79 is received by socket 42, and extension 80 is received by socket 43. Additionally, fourth row 96 of tubular extension matrix 84 is received by second row 60 such that extension 81 is received by socket 35, extension 82 is received by socket 36, and extension 83 is received by socket 37.

When plug 16 is attached in second inserted position 116, a portion of socket contacts 68 (shown in FIG. 3) are electrically connected to the phase windings (not shown) of motor 4, a portion of socket contacts 68 are electrically connected to the power supply terminals (not shown), and a portion of socket 32, 33, 34, 35, 36, 37, 38, 39, 40, 41, 42, and 43 are electrically isolated. When plug 16 is attached in second inserted position 116, the electrical connections between socket contacts 68 and the phase windings and the power supply terminals are arranged, and jumper wires 100 short together adjacent socket contacts 68, in such a configuration that the phase windings of motor 4 are electrically connected in series. Accordingly, when plug 16 is attached in second inserted position 116, and when the power supply terminals are electrically connected to a high voltage power source, terminal block 14 transfers high voltage to the motor phase windings such that motor 4 operates using the high voltage. In one embodiment, motor 4 operates at 460 Volts when plug 16 is attached in second inserted position 116. Alternatively, motor 4 may operate at any other suitable voltage level when plug 16 is attached in second inserted position 116.

Although tubular extension matrix 84 (shown in FIG. 5) and socket matrix 44 (shown in FIG. 2) are herein illustrated and described as '3×4' matrixes, and matrix 54 (shown in FIG. 2) is herein illustrated and described as a '3×5' matrix, it will be understood that matrixes 84, 44, and 54 may be any size and shape such that plug 16 is configured to be inserted within, and received by, terminal block 14 in a first inserted position that transfers a low voltage to motor 4, and a second inserted position that transfers a high voltage to motor 4.

Figure 9:
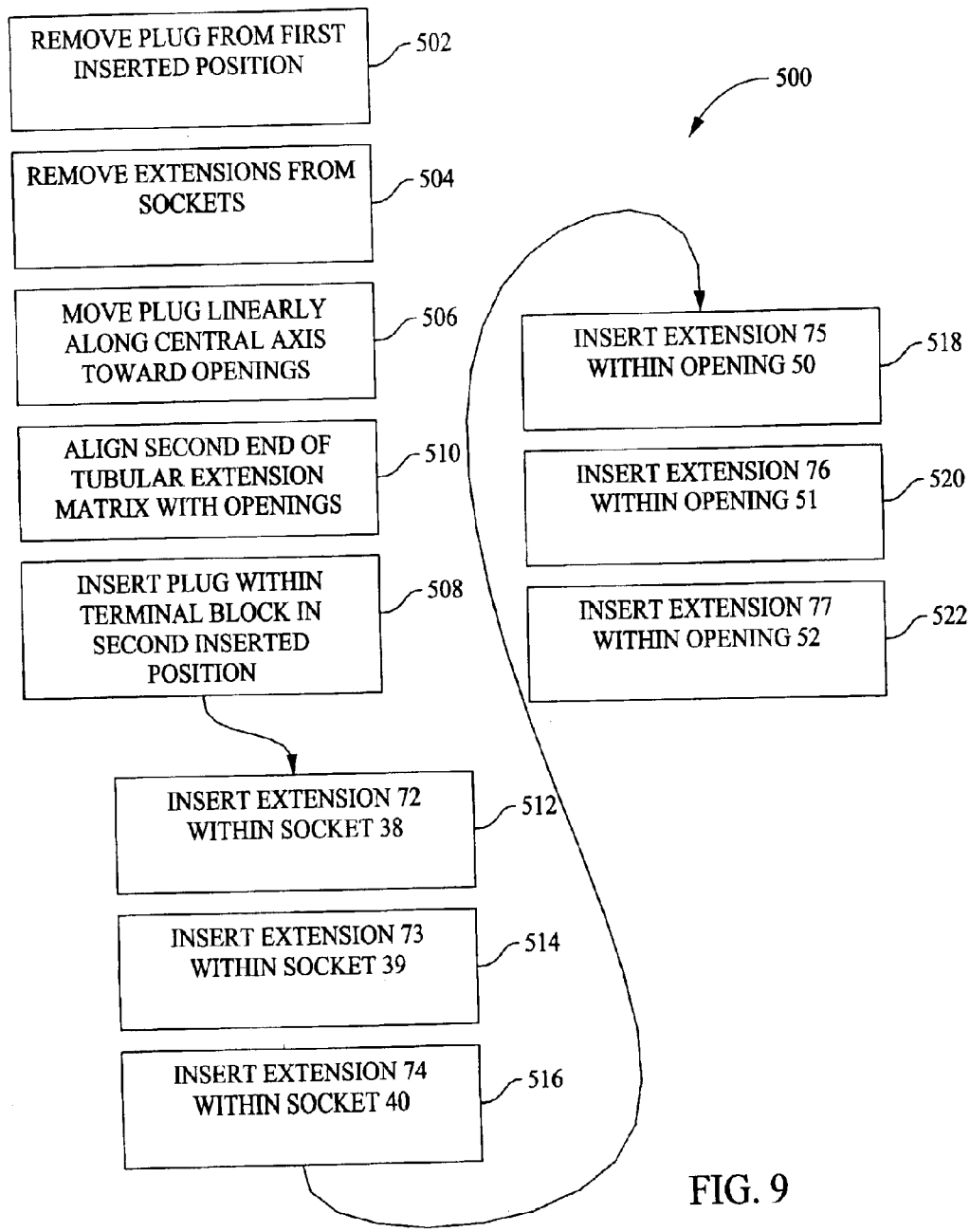
FIG. 9 is a flow chart illustrating one embodiment of a method of the present invention.

FIG. 9 is a flow chart illustrating an exemplary method 500 for changing the operating voltage of motor 4 (shown in FIG. 1) from a low voltage operation to a high voltage operation. Method 500 includes removing 502 plug 16 (shown in FIG. 5) from first inserted position 114 (shown in FIG. 7) by removing 504 extensions 72, 73, 74, 75, 76, 77, 78, 79, 80, 81, 82, and 83 (shown in FIG. 5) from their respective sockets 32, 33, 34, 35, 36, 37, 38, 39, 40, 41, 42, and 43 (shown in FIG. 2). Method 500 also includes moving 506 plug 16 linearly along terminal board central axis 56 (shown in FIG. 2) of terminal block 14 (shown in FIG. 2) toward openings 50, 51, and 52 (shown in FIG. 2), and re-inserting 508 plug 16 within terminal block 14, such that plug 16 is attached to terminal block 14 in second inserted position 116 (shown in FIG. 8). In one embodiment, because plug 16 is moved 506 linearly along central axis 56, the orientation of plug 16 relative to terminal block 14 remains the same while plug 16 is removed 502 from first inserted position 114 and re-inserted 508 within terminal block 14 in second inserted position 116. Inserting 508 plug 16 into second inserted position 116 includes aligning 510 tubular extension matrix second end 88 with openings 50, 51, and 52, and simultaneously inserting 512 extension 72 within socket 38, inserting 514 extension 73 within socket 39, inserting 516 extension 74 within socket 40, inserting 518 extension 75 within opening 50, inserting 520 extension 76 within opening 51, and inserting 522 the extension 77 within opening 52.

Figure 10:
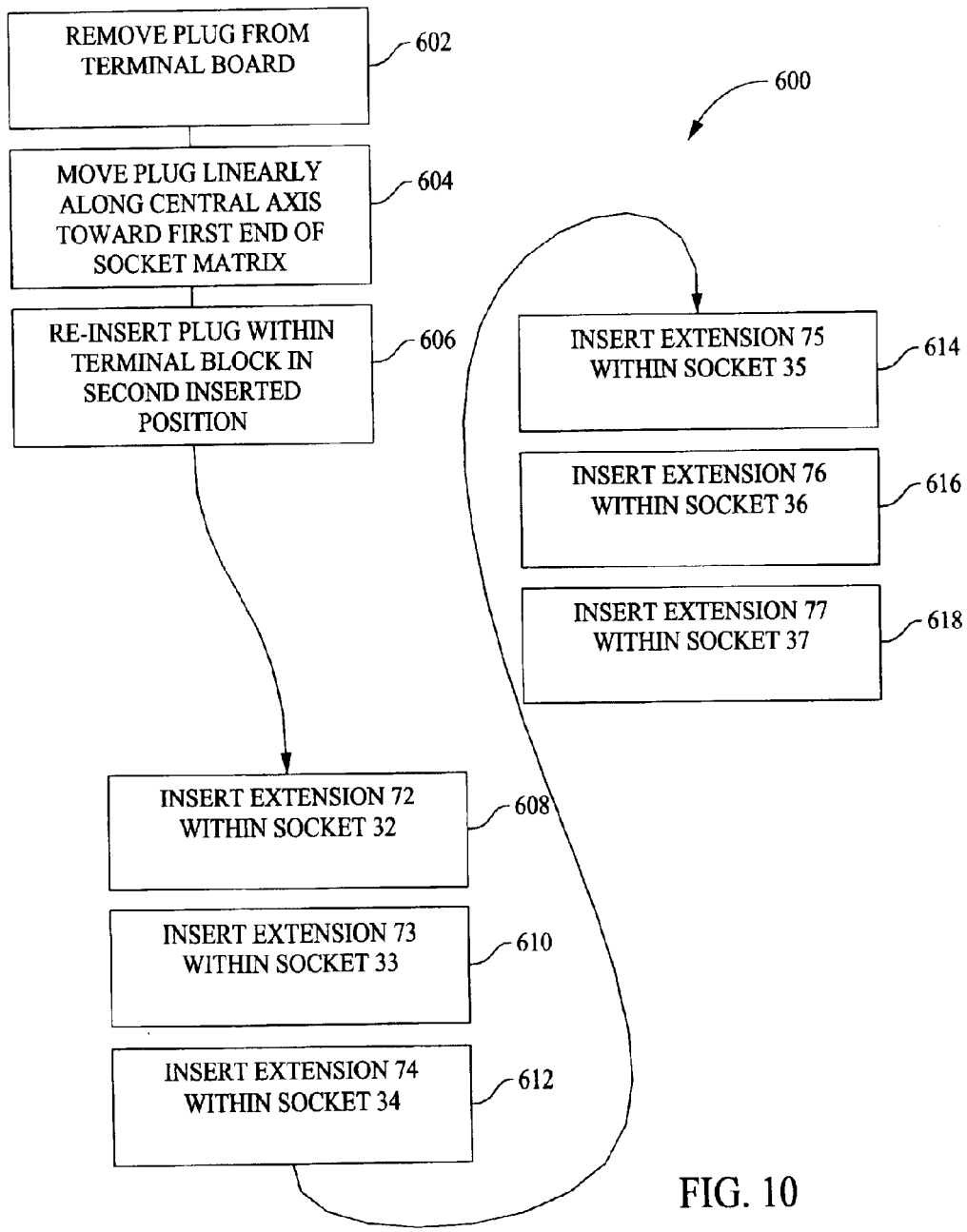
FIG. 10 is a flow chart illustrating one embodiment of a method of the present invention.

FIG. 10 is a flow chart illustrating an exemplary method 600 for changing the operating voltage of motor 4 (shown in FIG. 1) from a high voltage operation to a low voltage operation. Method 600 includes removing 602 plug 16 (shown in FIG. 5) from terminal board 14 (shown in FIG. 2), moving 604 plug 16 linearly along central axis 56 (shown in FIG. 2) of terminal block 14 (shown in FIG. 2) toward first end 46 of socket matrix 44, and re-inserting 606 plug 16 within terminal block 14 such that plug 16 is attached in first inserted position 114 (shown in FIG. 7). In one embodiment, because plug 16 is moved 604 linearly along central axis 56, the orientation of plug 16 relative to terminal block 14 remains the same while plug 16 is removed 602 from terminal block 14 and re-inserted 606 within terminal block 14 in first inserted position 114. Inserting 606 plug 16 into first inserted position 114 includes, simultaneously, inserting 608 extension 72 within socket 32, inserting 610 extension 73 within socket 33, inserting 612 extension 74 within socket 34, inserting 614 extension 75 within socket 35, inserting 616 extension 76 within socket 36, and inserting 618 extension 77 within socket 37.

While the invention has been described in terms of various specific embodiments, those skilled in the art will recognize that the invention can be practiced with modification within the spirit and scope of the claims.

What is claimed is:

1. A terminal board assembly for a multi-voltage device, said terminal board assembly comprising:
   a terminal board comprising a terminal block, said terminal board configured for attachment to the multi-voltage device, said terminal block configured to electrically couple with an electrical power source and the multi-voltage device; and
   a plug configured for insertion within said terminal block, said terminal block configured to receive said plug in at least one of a first inserted position and a second inserted position, the orientation of said plug relative to said terminal block the same in said first inserted position as in said second inserted position, said terminal block configured to transfer a first voltage to the multi-voltage device when said plug attached to said terminal block in said first inserted position, said terminal block configured to transfer a second voltage to the multi-voltage device when said plug attached to said terminal block in said second inserted position, said plug comprising a housing having a first face, a plurality of tubular extensions extending outwardly from said first face, and a plurality of jumper wires each having at least one leg, said jumper wire legs extending outwardly through said housing and within said tubular extensions, said tubular extensions extend beyond said jumper wire legs.

2. A terminal board assembly in accordance with claim 1, wherein the second voltage is greater than the first voltage.

3. A terminal board assembly in accordance with claim 1 wherein the multi-voltage device comprises a three-phase electric motor.

4. A terminal board assembly in accordance with claim 1, wherein said terminal board molded from plastic.

5. A terminal board assembly in accordance with claim 3 wherein the electric motor includes three windings, each winding representing a respective phase, said terminal block configured to transfer electrical power from the electrical power source to the windings.

6. A terminal board assembly in accordance with claim 1 wherein said terminal board further comprising a plurality slots extending therethrough and a plurality of power supply terminals mounted within said slots, each said power supply terminal electrically coupled to said terminal block and configured for connection to the electrical power source.

7. A terminal board assembly in accordance with claim 1 wherein said terminal block comprises a plurality of sockets arranged in a 3×4 matrix comprising a first end and a second end, and a plurality of openings aligned in a row and positioned adjacent said second end of said socket matrix such that said sockets and said three openings form a 3×5 matrix, each of said sockets comprising a socket contact, said socket matrix configured for electrical connection to the electrical power source and the multi-voltage device, and configured to transfer electrical power to the multi-voltage device.

8. A terminal board assembly in accordance with claim 1 wherein said plurality of tubular extensions extend outwardly from said first face to an outer end, said plurality of tubular extensions arranged in a 3×4 matrix having a first end and a second end.

9. A terminal board assembly in accordance with claim 1 wherein said plurality of jumper wires having a u-shaped each said jumper wire having a bottom, and two legs, each of said jumper wire bottoms mounted within said housing, said jumper wire legs extend outwardly from opposing ends of said bottom such that said plurality of jumper wires each comprise an open end and a closed end, said jumper wire legs extending from said bottoms through said housing and within said tubular extensions toward said tubular extension outward ends.

10. A terminal board assembly in accordance with claim 7 wherein said first end of said socket matrix comprising a first row of said sockets, said first row of said sockets comprising a first outer socket, a second outer socket, and a first inner socket, said first inner socket positioned between said first and second outer sockets, said second end of said socket matrix comprising a second row of said sockets, said second row of said sockets comprising a third outer socket, a fourth outer socket, and a second inner socket, said second inner socket between said third and fourth outer sockets.

11. A terminal board assembly in accordance with claim 8 wherein said first end of said tubular extension matrix comprising a first row of said tubular extensions, said first row of said tubular extensions comprising a first outer extension, a second outer extension, and a first inner extension, said first inner extension between said first and second outer extensions, said second end of said tubular extension matrix comprising a second row of said tubular extensions, said second row of said tubular extensions comprising a third outer extension, a fourth outer extension, and a second inner extension, said second inner extension between said third and fourth outer extensions.

12. A terminal board assembly in accordance with claim 1 wherein said terminal block comprises a plurality of sockets arranged in a matrix comprising a first end and a second end, and a plurality of openings aligned in a row and positioned adjacent said second end of said socket matrix, said first end of said socket matrix comprising a first outer socket and a second outer socket, said second end of said socket matrix comprising a third outer socket and a fourth outer socket, said plug comprising a housing having a first face and a plurality of tubular extensions extending outwardly from said first face to an outer end, said plurality of tubular extensions arranged in a matrix having a first end and a second end, said first end of said tubular extension matrix comprising a first outer extension and a second outer extension, said second end of said tubular matrix comprising a third outer extension and a fourth outer extension, each said tubular extension configured to mate with any one of said plurality of sockets and any one of said plurality of openings, each said socket and each said opening configured to receive any one of said plurality of extensions, said first inserted position comprising:

said first outer extension inserted within said first outer socket;

said second outer extension inserted within said second outer socket;

said third outer extension inserted within said third outer socket; and said fourth outer extension inserted within said fourth outer socket.

13. A terminal board assembly in accordance with claim 1 wherein said terminal block comprises a plurality of sockets arranged in a matrix comprising a first end and a second end, and a plurality of openings aligned in a row and positioned adjacent said second end of said socket matrix, said first end of said socket matrix comprising a first outer socket and a second outer socket, said second end of said socket matrix comprising a third outer socket and a fourth outer socket, said plug comprising a housing having a first face and a plurality of tubular extensions extending outwardly from said first face to an outer end, said plurality of tubular extensions arranged in a matrix having a first end and a second end, said first end of said tubular extension matrix comprising a first outer extension and a second outer extension, said second end of said tubular matrix comprising a third outer extension and a fourth outer extension, said socket matrix further comprising a fifth outer socket and a sixth outer socket, said plurality of openings comprising a first outer opening and a second outer opening, each said tubular extension configured to mate with any one of said plurality of sockets and any one of said plurality of openings, each said socket and each said opening configured to receive any one of said plurality of extensions, said second inserted position comprising:

said first outer extension inserted within said fifth outer socket;

said second outer extension inserted within said sixth outer socket;

said third outer extension inserted within said first outer opening; and said fourth outer extension inserted within said second outer opening.

14. A terminal board assembly in accordance with claim 7 wherein each said socket comprises a pin receptacle.

15. A terminal board assembly in accordance with claim 1 wherein the multi-voltage device includes a plurality of slots in the exterior surface of the multi-voltage device, said terminal board assembly further comprising a mounting assembly coupled thereto, said mounting assembly comprising:

a plurality of supports, said supports configured to couple with the plurality of slots such that said terminal board assembly fixedly coupled to the multi-voltage device.

16. A method for changing the operating voltage of a multi-voltage device including a terminal board, a terminal block coupled with the terminal board, and a plug inserted within and received by the terminal block, the terminal block configured to receive the plug in at least one of a first inserted position and a second inserted position, the terminal block including a central axis extending along the length thereof, said method comprising:

removing the plug from the first inserted position;

moving the plug linearly along the central axis of the terminal block; and inserting the plug within the terminal block such that the plug is attached to the terminal board in the second inserted position, wherein the plug includes:

a housing having a first face, a plurality of tubular extensions extending outwardly from the first face, and a plurality of jumper wires each having at least one leg, the jumper wire legs extending outwardly through the housing and within the tubular extensions, the tubular extensions extend beyond the jumper wire legs.

17. A method in accordance with claim 16 wherein the terminal block includes a plurality of sockets arranged in a 3×4 matrix having a first end and a second end, each socket having a socket contact electrically connected to the multi-voltage device and configured to transfer electrical power to the multi-voltage device, the plug arranged in a 3×4 matrix having a first end and a second end, said removing the plug from the first inserted position comprising removing the plurality of extensions from the plurality of sockets.

18. A method in accordance with claim 16 wherein the terminal block further includes a plurality of openings aligned in a row and positioned adjacent the second end of the socket matrix such that the sockets and the openings form a 3×5 matrix, said moving the plug linearly along the central axis of the terminal block comprising moving the plug linearly along the central axis of the terminal block towards the openings, and aligning the second end of the tubular extension matrix with the openings.

19. A method in accordance with claim 16 wherein the terminal block includes a plurality of sockets arranged in a matrix having a first end and a second end, and a plurality of openings aligned in a row and positioned adjacent the second end of the socket matrix, the first end of the socket matrix includes a first outer socket, a second outer socket, and a first inner socket, the first inner socket positioned between the first and second outer sockets, the second end of the socket matrix includes a third outer socket, a fourth outer socket, and a second inner socket, the second inner socket positioned between the third and fourth outer sockets, the plug includes a housing having a first face and a plurality of tubular extensions extending outwardly from the first face to an outer end, the plurality of tubular extensions arranged in a matrix having a first end and a second end, the first end of the tubular extension matrix includes a first outer extension, a second outer extension, and a first inner extension, the first inner extension positioned between the first and second outer extensions, the second end of the tubular extension matrix includes a third outer extension, a fourth outer extension, and a second inner extension, the second inner extension positioned between the third and fourth outer extensions, the socket matrix also includes a fifth outer socket, a sixth outer socket, and a third inner socket, the third inner socket positioned between the fifth outer socket and the sixth outer socket, the plurality of openings includes a first outer opening, a second outer opening, and a first inner opening, and the first inner opening positioned between the first and second outer openings, said inserting the plug within the terminal block such that the plug in the second inserted position comprising:

inserting the first outer extension within the fifth outer socket;

inserting the second outer extension within the sixth outer socket;

inserting the first inner extension within the third inner socket;

inserting the third outer extension within the first outer opening;

inserting the fourth outer extension within the second outer opening; and inserting the second inner extension within the first inner opening.

20. A method in accordance with claim 16 further comprising:

removing the plug from the second inserted position;

moving the plug linearly along the central axis of the terminal block; and inserting the plug within the terminal block such that the plug in the first inserted position.

21. A method in accordance with claim 20, wherein the terminal block includes a plurality of sockets arranged in a matrix having a first end and a second end, and a plurality of openings aligned in a row and positioned adjacent the second end of the socket matrix, the first end of the socket matrix includes a first outer socket, a second outer socket, and a first inner socket, the first inner socket positioned between the first and second outer sockets, the second end of the socket matrix includes a third outer socket, a fourth outer socket, and a second inner socket, the second inner socket positioned between the third and fourth outer sockets, the plug includes a housing having a first face and a plurality of tubular extensions extending outwardly from the first face to an outer end, the plurality of tubular extensions arranged in a matrix having a first end and a second end, the first end of the tubular extension matrix includes a first outer extension, a second outer extension, and a first inner extension, the first inner extension positioned between the first and second outer extensions, the second end of the tubular matrix includes a third outer extension, a fourth outer extension, and a second inner extension, and the second inner extension positioned between the third and fourth outer extensions, said inserting the plug within the terminal block such that the plug in the first inserted position comprising:

inserting the first outer extension within the first outer socket;

inserting the second outer extension within the second outer socket;

inserting the first inner extension within the first inner socket;

inserting the third outer extension within the third outer socket;

inserting the fourth outer extension within the fourth outer socket; and inserting the second inner extension within the second inner socket.

22. A terminal board assembly for a multi-voltage device, said terminal board assembly comprising:

a terminal board comprising a terminal block, said terminal board configured for attachment to the multi-voltage device, said terminal block integral with said terminal board and configured to electrically couple with an electrical power source and the multi-voltage device; and a plug configured for insertion within said terminal block, said terminal block configured to receive said plug in at least one of a first inserted position and a second inserted position, said terminal block configured to transfer a first voltage to the multi-voltage device when said plug attached to said terminal block in said first inserted position, said terminal block configured to transfer a second voltage to the multi-voltage device when said plug attached to said terminal block in said second inserted position, said plug comprising a housing having a first face, a plurality of tubular extensions extending outwardly from said first face, and a plurality of jumper wires each having at least one leg, said jumper wire legs extending outwardly through said housing and within said tubular extensions, said tubular extensions extend beyond said jumper wire legs.

23. A terminal board assembly in accordance with claim 22 wherein said terminal block comprises a plurality of sockets arranged in a 3×4 matrix comprising a first end and a second end, and a plurality of openings aligned in a row and positioned adjacent said second end of said socket matrix such that said sockets and said three openings form a 3×5 matrix, each of said sockets comprising a socket contact, said socket matrix configured for electrical connection to the electrical power source and the multi-voltage device, and configured to transfer electrical power to the multi-voltage device.

24. A terminal board assembly in accordance with claim 22 wherein said plurality of tubular extensions extend outwardly from said first face to an outer end, said plurality of tubular extensions arranged in a 3×4 matrix having a first end and a second end.

25. A terminal board assembly in accordance with claim 22 wherein said terminal block comprises a plurality of sockets arranged in a matrix comprising a first end and a second end, and a plurality of openings aligned in a row and positioned adjacent said second end of said socket matrix, said first end of said socket matrix comprising a first outer socket and a second outer socket, said second end of said socket matrix comprising a third outer socket and a fourth outer socket, said plug comprising a housing having a first face and a plurality of tubular extensions extending outwardly from said first face to an outer end, said plurality of tubular extensions arranged in a matrix having a first end and a second end, said first end of said tubular extension matrix comprising a first outer extension and a second outer extension, said second end of said tubular matrix comprising a third outer extension and a fourth outer extension, each said tubular extension configured to mate with any one of said plurality of sockets and any one of said plurality of openings, each said socket and each said opening configured to receive any one of said plurality of extensions, said first inserted position comprising:

said first outer extension inserted within said first outer socket;

said second outer extension inserted within said second outer socket;

said third outer extension inserted within said third outer socket; and said fourth outer extension inserted within said fourth outer socket.

26. A terminal board assembly in accordance with claim 22 wherein said terminal block comprises a plurality of sockets arranged in a matrix comprising a first end and a second end, and a plurality of openings aligned in a row and positioned adjacent said second end of said socket matrix, said first end of said socket matrix comprising a first outer socket and a second outer socket, said second end of said socket matrix comprising a third outer socket and a fourth outer socket, said plug comprising a housing having a first face and a plurality of tubular extensions extending outwardly from said first face to an outer end, said plurality of tubular extensions arranged in a matrix having a first end and a second end, said first end of said tubular extension matrix comprising a first outer extension and a second outer extension, said second end of said tubular extension matrix comprising a third outer extension and a fourth outer extension, said socket matrix further comprising a fifth outer socket and a sixth outer socket, said plurality of openings comprising a first outer opening and a second outer opening, each said tubular extension configured to mate with any one of said plurality of sockets and any one of said plurality of openings, each said socket and each said opening configured to receive any one of said plurality of extensions, said second inserted position comprising:

said first outer extension inserted within said fifth outer socket;

said second outer extension inserted within said sixth outer socket;

said third outer extension inserted within said first outer opening; and said fourth outer extension inserted within said second outer opening.

27. A terminal board assembly in accordance with claim 22 wherein the orientation of said plug relative to said terminal block is the same in said first inserted position and said second inserted position.

* * * * *

UNITED STATES PATENT AND TRADEMARK OFFICE
CERTIFICATE OF CORRECTION

PATENT NO. : 6,879,070 B2  Page 1 of 1
APPLICATION NO. : 10/062103
DATED : April 12, 2005
INVENTOR(S) : Leany et al.

It is certified that error appears in the above-identified patent and that said Letters Patent is hereby corrected as shown below:

In Claim 9, column 8, line 31, delete "u-shaped" and insert therefor -- u-shape, --.

Signed and Sealed this

First Day of April, 2008

JON W. DUDAS
*Director of the United States Patent and Trademark Office*